(12) United States Patent
Hu et al.

(10) Patent No.: US 12,154,480 B2
(45) Date of Patent: Nov. 26, 2024

(54) MITIGATING ARTIFACTS CAUSED BY AN UNDER-DISPLAY LIGHT EMITTER

(71) Applicant: Apple Inc., Cupertino, CA (US)

(72) Inventors: Jenny Hu, Sunnyvale, CA (US); Chaohao Wang, Shanghai (CN); Christopher E Glazowski, Santa Cruz, CA (US); Clint M Perlaki, Milpitas, CA (US); David R Manly, San Francisco, CA (US); Feng Wen, Cupertino, CA (US); Graeme M Williams, San Diego, CA (US); Hei Kam, Sunnyvale, CA (US); Hyun H Boo, Santa Clara, CA (US); Kevin J Choboter, Pacifica, CA (US); Kyounghwan Kim, San Jose, CA (US); Lu Yan, Cupertino, CA (US); Mahesh B Chappalli, San Jose, CA (US); Mark T Winkler, Menlo Park, CA (US); Na Zhu, Sunnyvale, CA (US); Peter F Holland, Los Gatos, CA (US); Tong Chen, Fremont, CA (US); Warren S Rieutort-Louis, Cupertino, CA (US); Wenrui Cai, Saratoga, CA (US); Ximeng Guan, San Jose, CA (US); Yingying Tang, Cupertino, CA (US); Yuchi Che, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/184,592

(22) Filed: Mar. 15, 2023

(65) Prior Publication Data
US 2023/0410718 A1    Dec. 21, 2023

Related U.S. Application Data

(60) Provisional application No. 63/353,489, filed on Jun. 17, 2022.

(51) Int. Cl.
    G09G 3/3233    (2016.01)
    G06F 3/042     (2006.01)
    (Continued)

(52) U.S. Cl.
    CPC ........... G09G 3/2096 (2013.01); G06F 3/042 (2013.01); G09G 3/3233 (2013.01);
    (Continued)

(58) Field of Classification Search
    CPC ......... G09G 3/3233; G09G 2300/0861; G09G 3/3225; G09G 2320/0247;
    (Continued)

(56) References Cited

U.S. PATENT DOCUMENTS 7,355,606 B2   4/2008   Paquette
7,940,457 B2   5/2011   Jain et al.
(Continued)

FOREIGN PATENT DOCUMENTS

CN    108847415 A    11/2018
CN    109192759 A    1/2019
(Continued)

*Primary Examiner* — Dismery Mercedes
(74) *Attorney, Agent, or Firm* — Treyz Law Group, P.C.; Joseph F. Guihan; Jinie M. Guihan (57) ABSTRACT

A light emitter that operates through a display may cause display artifacts, even when the light emitter operates using non-visible wavelengths. Display artifacts caused by a light emitter that operates through a display may be referred to as emitter artifacts. To mitigate emitter artifacts, operating conditions for a display frame may be used to determine an optimal firing time for the light emitter during that display frame. The operating conditions used to determine the optimal firing time may include emitter operating conditions, display content statistics, display brightness, temperature, and refresh rate. Operating conditions from one or more previous frames may be stored in a frame buffer and
(Continued)

may be used to help determine the optimal firing time for the light emitter during a display frame. Pixel values for the display may be modified to mitigate emitter artifacts.

20 Claims, 9 Drawing Sheets (51) Int. Cl.
  G09G 3/20 (2006.01)
  G09G 3/34 (2006.01)
  G06F 3/041 (2006.01)
(52) U.S. Cl.
  CPC ......... *G09G 3/3406* (2013.01); *G06F 3/0412* (2013.01); *G09G 2300/0819* (2013.01); *G09G 2320/0285* (2013.01); *G09G 2320/0295* (2013.01); *G09G 2360/14* (2013.01); *G09G 2360/145* (2013.01); *G09G 2360/16* (2013.01)
(58) Field of Classification Search
  CPC ....... G09G 2320/0295; G09G 2360/16; G09G 2320/02; G09G 3/3208; G09G 2300/0819; G09G 3/006; G09G 2320/064; G09G 2320/0626; G09G 2320/06; G06F 3/0412; G06F 3/04184
  See application file for complete search history.

(56) References Cited

U.S. PATENT DOCUMENTS

| | | | |
|---|---|---|---|
| 8,724,942 B2 | 5/2014 | Logunov et al. | |
| 9,024,530 B2 | 5/2015 | Land et al. | |
| 9,098,136 B2 | 8/2015 | Kim | |
| 9,109,952 B2 | 8/2015 | Dinh et al. | |
| 10,268,884 B2 | 4/2019 | Jones et al. | |
| 11,030,946 B1* | 6/2021 | Chen | G09G 3/20 |
| 11,929,018 B2* | 3/2024 | Youn | G09G 5/10 |
| 11,948,509 B2* | 4/2024 | Choi | G09G 3/3225 |
| 2008/0094344 A1* | 4/2008 | Kuroki | G09G 3/342 345/102 |
| 2011/0050739 A1* | 3/2011 | Namioka | G09G 3/3406 345/690 |
| 2011/0141069 A1* | 6/2011 | Hirakata | G09G 5/393 345/204 |
| 2014/0375704 A1 | 12/2014 | Bi et al. | |
| 2015/0241705 A1 | 8/2015 | Abovitz et al. | |
| 2016/0314760 A1* | 10/2016 | Jangda | G09G 3/3208 |
| 2017/0116934 A1 | 4/2017 | Tien et al. | |
| 2019/0006438 A1 | 1/2019 | Wu et al. | |
| 2019/0041658 A1 | 2/2019 | Gollier et al. | |
| 2019/0080668 A1* | 3/2019 | Holenarsipur | G01J 1/0474 |
| 2019/0094541 A1 | 3/2019 | Choi et al. | |
| 2019/0287463 A1* | 9/2019 | Zhang | G09G 3/3258 |
| 2020/0019747 A1 | 1/2020 | Yang et al. | |
| 2020/0211481 A1* | 7/2020 | Lee | G09G 3/3406 |
| 2020/0294468 A1* | 9/2020 | Hung | G09G 5/10 |
| 2020/0402450 A1* | 12/2020 | Chaji | H01L 33/502 |
| 2021/0090523 A1* | 3/2021 | Huang | G06F 3/0421 |
| 2021/0185785 A1* | 6/2021 | Cho | H04N 23/57 |
| 2021/0287602 A1 | 9/2021 | Chen et al. | |
| 2021/0398486 A1* | 12/2021 | Hamaguchi | G09G 3/3233 |
| 2022/0165193 A1* | 5/2022 | Buckley | G06T 5/20 |
| 2022/0246096 A1* | 8/2022 | Choi | G09G 3/3233 |
| 2022/0336560 A1* | 10/2022 | Barel | G06F 3/041 |
| 2022/0366873 A1* | 11/2022 | Goettker | G09G 5/00 |
| 2023/0214058 A1* | 7/2023 | Kallio | G06F 3/0421 345/175 |
| 2023/0222972 A1* | 7/2023 | Choi | G09G 3/3225 345/76 |

FOREIGN PATENT DOCUMENTS

| | | |
|---|---|---|
| CN | 109348012 A | 2/2019 |
| CN | 109378316 A | 2/2019 |
| CN | 110444125 A | 11/2019 |
| WO | 2020219267 A1 | 10/2020 |

\* cited by examiner

MITIGATING ARTIFACTS CAUSED BY AN UNDER-DISPLAY LIGHT EMITTER

This application claims the benefit of U.S. Provisional Patent Application No. 63/353,489, filed Jun. 17, 2022, which is hereby incorporated by reference herein in its entirety.

BACKGROUND

This relates generally to electronic devices, and, more particularly, to electronic devices with displays.

Electronic devices often include displays. For example, an electronic device may have a light-emitting diode (LED) display based on light-emitting diode pixels. In this type of display, each pixel includes a light-emitting diode and circuitry for controlling application of a signal to the light-emitting diode to produce light.

There is a trend towards borderless electronic devices with a full-face display. These devices, however, may still need to include sensors such as cameras, ambient light sensors, and proximity sensors to provide other device capabilities. Since the display now covers the entire front face of the electronic device, the sensors will have to be placed under the display stack.

It is within this context that the embodiments herein arise.

SUMMARY

An electronic device may include a display with pixels, a sensor (such as a proximity sensor) with a light emitter that emits light through the display, and control circuitry. The control circuitry may be configured to determine an optimal firing time for the light emitter in the proximity sensor based on operating conditions for a given display frame. The control circuitry may be configured to control the light emitter to emit light at the optimal firing time during the given display frame.

An electronic device may include a display with pixels, a sensor (such as a proximity sensor) with a light emitter that emits light through the display, and control circuitry. The control circuitry may be configured to, based on operating conditions for a given display frame, modify pixel data for the given display frame to mitigate artifacts caused by the light from the light emitter passing through the display.

An electronic device may include a display with pixels, a sensor (such as a proximity sensor) with a light emitter that emits light through the display, and control circuitry. The control circuitry may be configured to, for each pixel in a subset of the pixels, determine an emitter artifact profile for that pixel using at least a brightness of that pixel for a given display frame and a look-up table. The control circuitry may be configured to spatially weight the emitter artifact profiles for the subset of the pixels to obtain a single representative emitter artifact profile for the subset of the pixels. The control circuitry may be configured to use the single representative emitter artifact profile to determine an optimal firing time for the light emitter in the proximity sensor. The control circuitry may be configured to control the light emitter to emit light at the optimal firing time during the given display frame.

DETAILED DESCRIPTION

Figure 1:
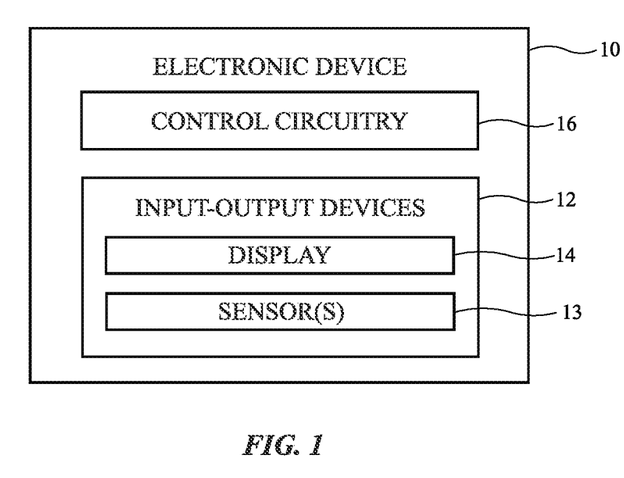
FIG. 1 is a schematic diagram of an illustrative electronic device having a display and one or more sensors in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Input-output devices 12 may also include one or more sensors 13 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 13 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 13 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be an organic light-emitting diode display, a display formed from an array of discrete light-emitting diodes (microLEDs) each formed from a crystalline semiconductor die, a liquid crystal display or any other suitable type of display. Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
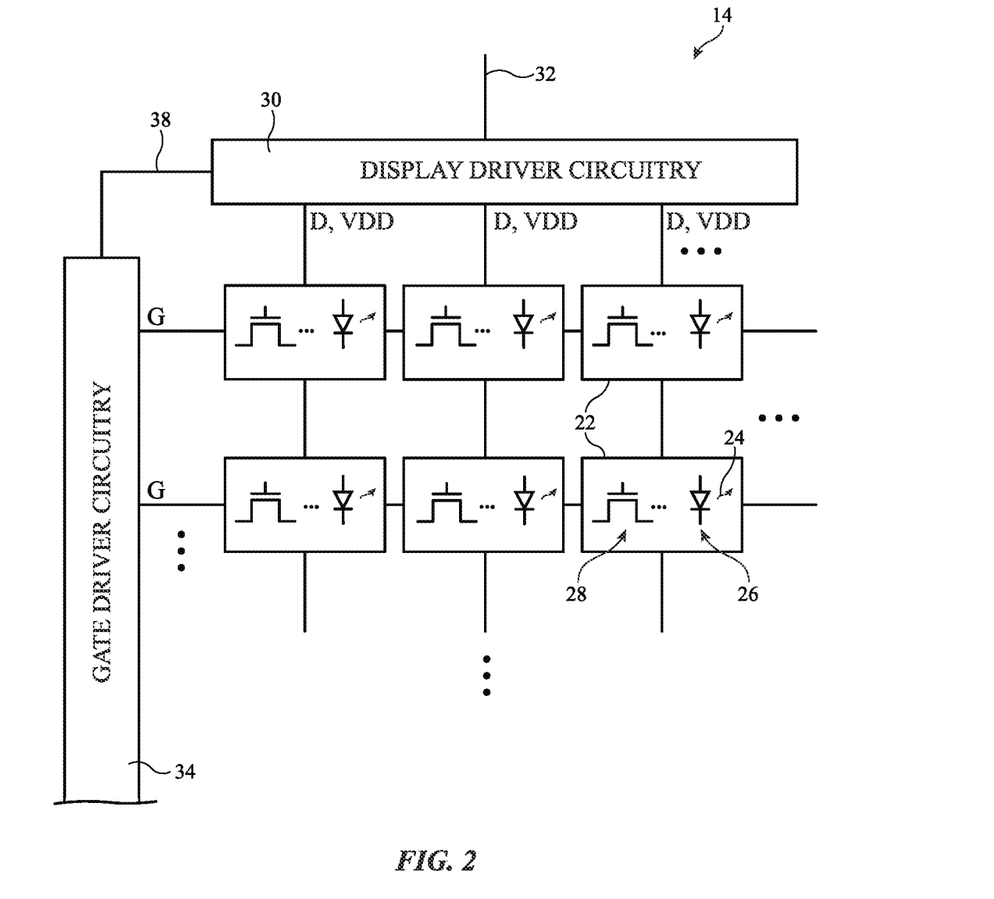
FIG. 2 is a schematic diagram of an illustrative display with light-emitting elements in accordance with some embodiments.

A top view of a portion of display 14 is shown in FIG. 2. As shown in FIG. 2, display 14 may have an array of pixels 22 formed on a substrate. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may include a light-emitting diode 26 that emits light 24 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductors. Pixels 22 may contain light-emitting diodes of different colors (e.g., red, green, and blue) to provide display 14 with the ability to display color images or may be monochromatic pixels.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply display driver circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 22 of each row. There may be any suitable number of horizontal control signals per row of pixels 22 (e.g., one or more row control signals, two or more row control signals, three or more row control signals, four or more row control signals, etc.).

The region on display 14 where the display pixels 22 are formed may sometimes be referred to herein as the active area. Electronic device 10 has an external housing with a peripheral edge. The region surrounding the active area and within the peripheral edge of device 10 is the border region. Images can only be displayed to a user of the device in the active region. It is generally desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Figure 3:
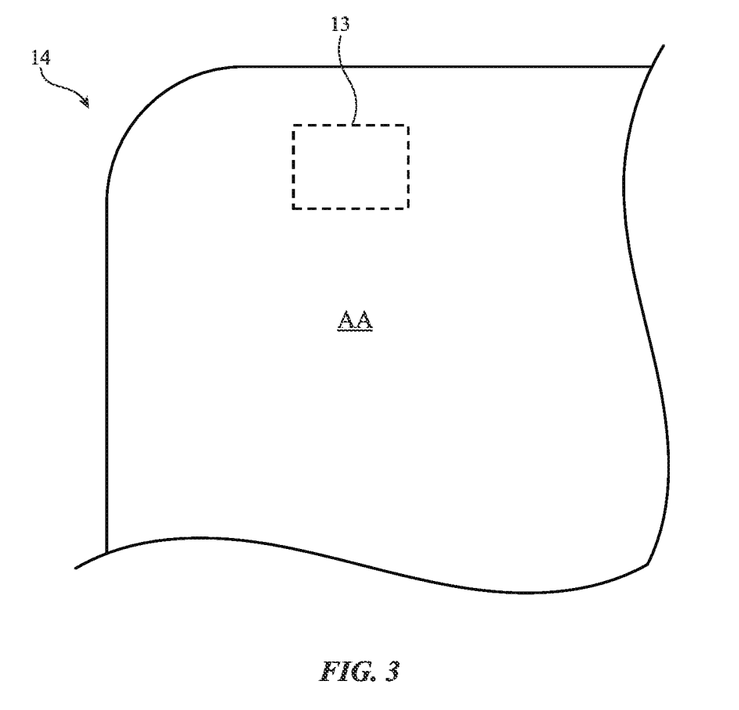
FIG. 3 is a top view of an illustrative display with an underlying sensor in accordance with some embodiments.

Device 10 may include a sensor 13 mounted behind display 14 (e.g., behind the active area of the display). FIG. 3 is a top view of an illustrative display 14 with a sensor 13 mounted behind the active area (AA) of the display. Sensor 13 may sometimes include a light-emitting component in addition to a sensor component. As one illustrative example, sensor 13 may be a proximity sensor that includes a light source in addition to a light sensor. The light source is configured to emit light through the active area of the display from underneath the active area of the display. The light sensor is configured to sense reflections of the emitted light that pass through the active area of the display to the light sensor. The light source may emit light in a series of pulses at a desired frequency. Each pulse has a desired duration. The properties of the pulses (e.g., frequency, duration, wavelength, intensity, etc.) may sometimes be referred to as a firing mode for the emitter.

To mitigate the impact of sensor 13 on the operation of display 14, sensor 13 may include a light emitter that operates using non-visible-wavelength light. For example, sensor 13 may include an infrared (IR) light emitter or an ultraviolet (UV) light emitter and may have a corresponding light sensor (e.g., an IR light sensor for an IR light emitter or a UV light sensor for a UV light emitter). Using a light emitter that operates using non-visible-wavelength light may prevent the light emitted by the light emitter from being directly observed by a viewer of display 14. However, the light emitter may still cause visible artifacts in display 14.

As previously mentioned, display 14 includes thin-film transistor circuitry that may include polysilicon thin-film transistors, semiconducting-oxide thin-film transistors such as indium zinc gallium oxide (IGZO) transistors, and/or thin-film transistors formed from other semiconductors. Additionally, display 14 may include one or more organic layers that form organic light-emitting diode pixels in an organic light-emitting diode display. One or more materials in the thin-film transistor circuitry and the organic layers that form pixels 22 may be photosensitive to non-visible-wavelength light. Accordingly, even if sensor 13 includes a light emitter that uses non-visible-wavelength light, emissions of the non-visible-wavelength light may cause display artifacts in the localized region of the display that overlaps the light emitter.

Display artifacts caused by emission of the light emitter in sensor 13 may include causing a region of the display over the light emitter to have a different brightness or color than the surrounding portions of the display. The artifacts may be static or may be transient (e.g., may rapidly appear and disappear so as to have the appearance of blinking). The artifacts may be more visible in a dark ambient light environment than in a bright ambient light environment.

The type and severity of the display artifacts caused by emission of the light emitter in sensor 13 may depend on emitter wavelength, emitter beam size, emitter irradiation level, emitter pulse duration, emitter firing rate, display panel architecture, display OLED design, display TFT design, the brightness of content on the display over the emitter, the color of content on the display over the emitter, display refresh rate, temperature, etc.

Herein, electronic device 10 is designed to ensure that display artifacts caused by emission of the light emitter in sensor 13 are mitigated at least to below a just-noticeable difference (JND) level. At or above the JND level, the display artifacts may be detectable to the viewer. Below the JND level, the display artifacts may not be detectable to the viewer. By mitigating display artifacts to below JND level, the display artifacts may be effectively eliminated from the viewer experience.

Display artifacts caused by emission of the light emitter in sensor 13 may hereinafter be referred to as emitter artifacts. One way to mitigate emitter artifacts is to tune the properties of the emitter itself. Generally, reducing irradiation power and/or density level will improve emitter artifacts with a tradeoff of lower signal to noise ratio in the sensor. Generally, reducing pulse duration will improve emitter artifacts with a tradeoff of lower signal to noise ratio in the sensor. Generally, reducing firing frequency will improve emitter artifacts with a tradeoff of lower signal to noise ratio in the sensor. Generally, using a higher wavelength for the light emitted by the emitter results in less photon energy and, correspondingly, mitigated emitter artifacts. However, other design considerations (e.g., manufacturability, cost, and/or performance) may prefer a lower wavelength for the light emitted by the emitter.

In general, the emitter wavelength, irradiation power and/or density level, pulse duration, and firing frequency may all be tuned to optimize emitter artifacts and sensor performance.

Figure 4:
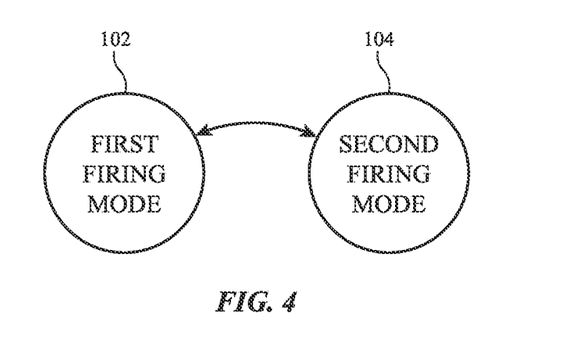
FIG. 4 is a state diagram of an illustrative light emitter in a proximity sensor in accordance with some embodiments.

In some cases, the emitter may be operable in first and second firing modes shown in the state diagram of FIG. 4. In first firing mode 102, the emitter may operate using first properties. In the second firing mode 104, the emitter may operate using second properties. At least one of the emitter wavelength, irradiation power and/or density level, pulse duration, and firing frequency may be different between mode 102 and mode 104.

In some cases, the firing mode of the emitter may be determined without factoring in mitigation of emitter artifacts. For example, the firing mode may have a high firing frequency in the first mode and a lower firing frequency in the second mode. The emitter may be placed in the first mode when a device use case dictates a high sensitivity and the emitter may be placed in the second mode when a device use case does not require such a high sensitivity. Alternatively or in addition, the emitter may be placed in one of the first and second modes at least partially based on emitter artifact considerations. For example, the emitter artifacts may generally be lower when the emitter operates in the second mode than when in the first mode. Accordingly, when a situation is detected where the display is vulnerable to emitter artifacts (e.g., low ambient light conditions), the emitter may be placed in the second mode. When a situation is detected where the display is less vulnerable to emitter artifacts (e.g., high ambient light conditions), the emitter may be placed in the first mode.

Figure 5A:
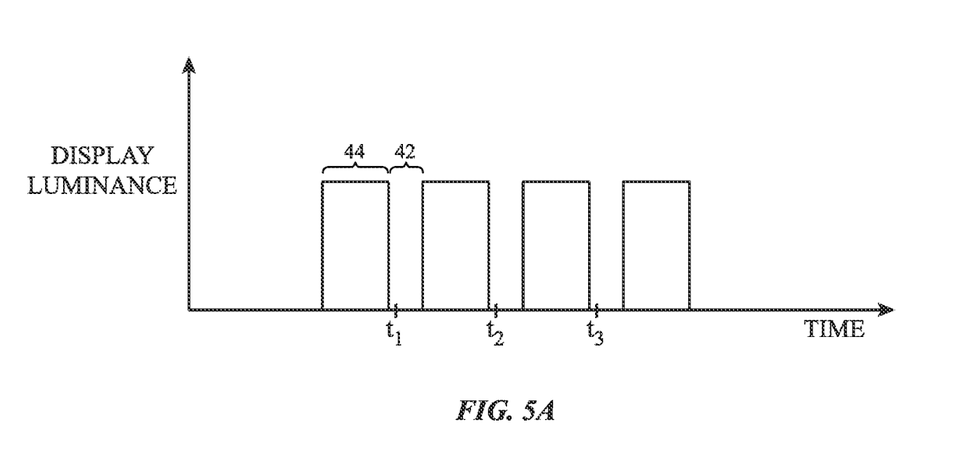
FIG. 5A is a graph of display luminance over time for an illustrative display in accordance with some embodiments.
Figure 5B:
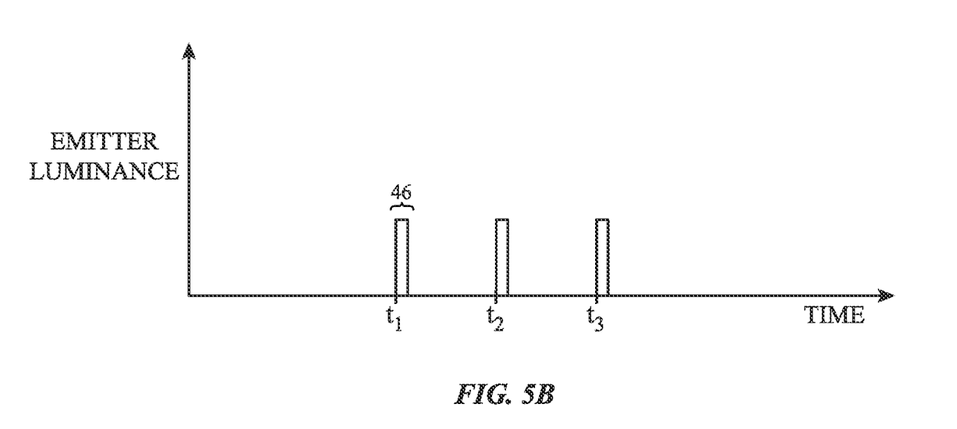
FIG. 5B is a graph of emitter luminance over time for an illustrative light emitter in accordance with some embodiments.

Another technique for mitigating emitter artifacts is shown in FIGS. 5A and 5B. FIG. 5A shows display luminance overtime whereas FIG. 5B shows emitter luminance over time. As shown in FIG. 5A, display 14 may operate in a series of display frames that each have a blanking period 42 and an emission period 44. The blanking periods 42 are interposed between emission periods 44. To mitigate emitter artifacts, pulses from the emitter may be synchronized with blanking periods 42. As shown in FIG. 5B, the emitter may fire at $t_1$ (which is during a first blanking period in FIG. 5A), $t_2$ (which is during a second blanking period in FIG. 5A), and $t_3$ (which is during a third blanking period in FIG. 5A).

Electronic device 10 may be designed such that the duration of blanking periods 42 are greater than the duration of the firing duration 46 for the emitter. In this way, the emitter pulses may be included entirely within a given blanking period.

In some cases, display 14 may be tunable between different modes with different blanking mode frequencies and durations. In this case, the emitter may be tuned between multiple firing modes to a firing mode that best aligns with the blanking periods of the current display mode.

The duration of a display frame may be defined as the time between the beginning of an emission period (e.g., emission period 44 in FIG. 5A) and the end of a blanking period (e.g., blanking period 42). The end of the blanking period corresponds to the beginning of the emission period for the next frame. Due to the display's TFT pixel circuit operation, changing the emitter firing time relative to the display frame may impact the emitter artifacts. For example, for static emitter conditions (e.g., constant firing frequency/pulse duration) and static display conditions (e.g., same content is displayed over the emitter, same refresh rate, same display hardware, etc.), sweeping the firing time of a pulse from the light emitter from the beginning of a display frame to the end of a display frame may gradually change the emitter artifact (e.g., from brighter than the surrounding display to dimmer than the surrounding display). At some point when sweeping the firing time of a pulse from the light emitter from the beginning of a display frame to the end of a display frame, the emitter artifact may be below JND levels. Therefore, there is an optimal firing time for the emitter that may be used to mitigate the emitter artifacts.

Figure 6:
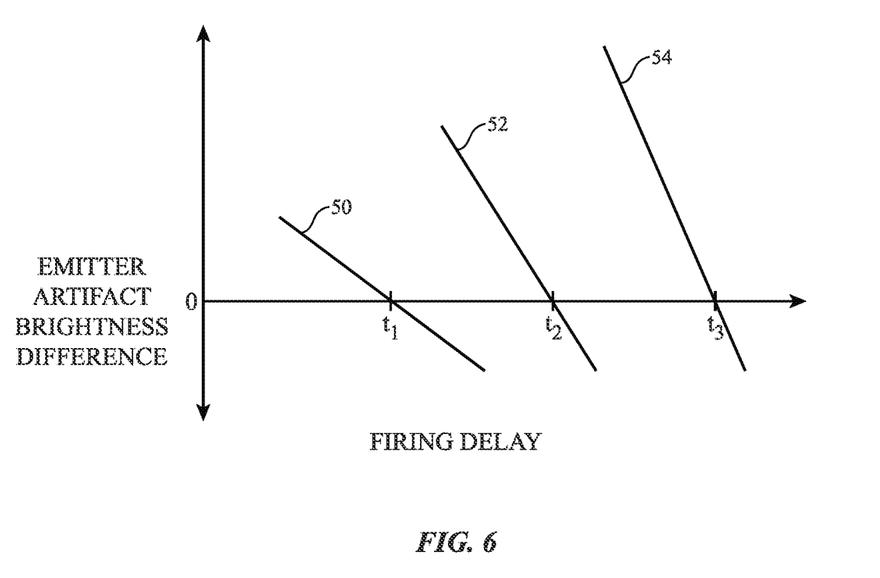
FIG. 6 is a graph of emitter artifact brightness difference as a function of firing delay for a light emitter in an illustrative electronic device of the type shown in FIG. 1 in accordance with some embodiments.

FIG. 6 is a graph of emitter artifact brightness difference as a function of firing delay under various display conditions. Each one of profiles 50, 52, and 54 is associated with an emitter having the same operating conditions (e.g., including wavelength, pulse duration, pulse intensity, etc.). However, profile 50, 52, and 54 are associated with the display having respective unique operating conditions (e.g., refresh rate, temperature, content brightness, content color, etc.). Profile 50 is for an emitter operating through a display with first operating conditions, profile 52 is for an emitter operating through a display with second operating conditions, and profile 54 is for an emitter operating through a display with third operating conditions.

As shown in FIG. 6, profile 50 starts with an associated emitter artifact brightness difference that is positive (e.g., the emitter artifacts are brighter than the surrounding display portions) and decreases over time. Accordingly, at $t_1$, profile 50 intersects a point where the emitter artifact brightness difference is 0. Therefore, an emitter that is operating through a display with the first operating conditions may use a firing delay of $t_1$ to mitigate emitter artifacts. The same principles may be applied to profiles 52 and 54. At $t_2$, profile 52 intersects a point where the emitter artifact brightness difference is 0. Therefore, an emitter that is operating through a display with the second operating conditions may use a firing delay of $t_2$ to mitigate emitter artifacts. At $t_3$, profile 54 intersects a point where the emitter artifact brightness difference is 0. Therefore, an emitter that is operating through a display with the third operating conditions may use a firing delay of $t_3$ to mitigate emitter artifacts.

It should be noted that the profiles of FIG. 6 are merely illustrative. In general, profiles 50, 52, and 54 may have any desired shapes (e.g., non-linear).

To mitigate emitter artifacts, the firing delay for the light emitter may be selected based on real-time display operating conditions. Considering the example of FIG. 6, the emitter may operate using firing delay $t_1$ when the display operating conditions closely resemble the first operating conditions from FIG. 6. At a different time, the emitter may operate using firing delay $t_2$ when the display operating conditions closely resemble the second operating conditions from FIG. 6. At a different time, the emitter may operate using firing delay $t_3$ when the display operating conditions closely resemble the third operating conditions from FIG. 6.

The profiles in FIG. 6 may be referred to as emitter artifact profiles. The emitter artifact profile provides information regarding the severity of the emitter artifacts as a function of the firing delay in the emitter. To optimize emitter artifacts in real time, control circuitry 16 in electronic device 10 may derive a real-time emitter artifact profile based on the real-time operating conditions of display 14.

Figure 7:
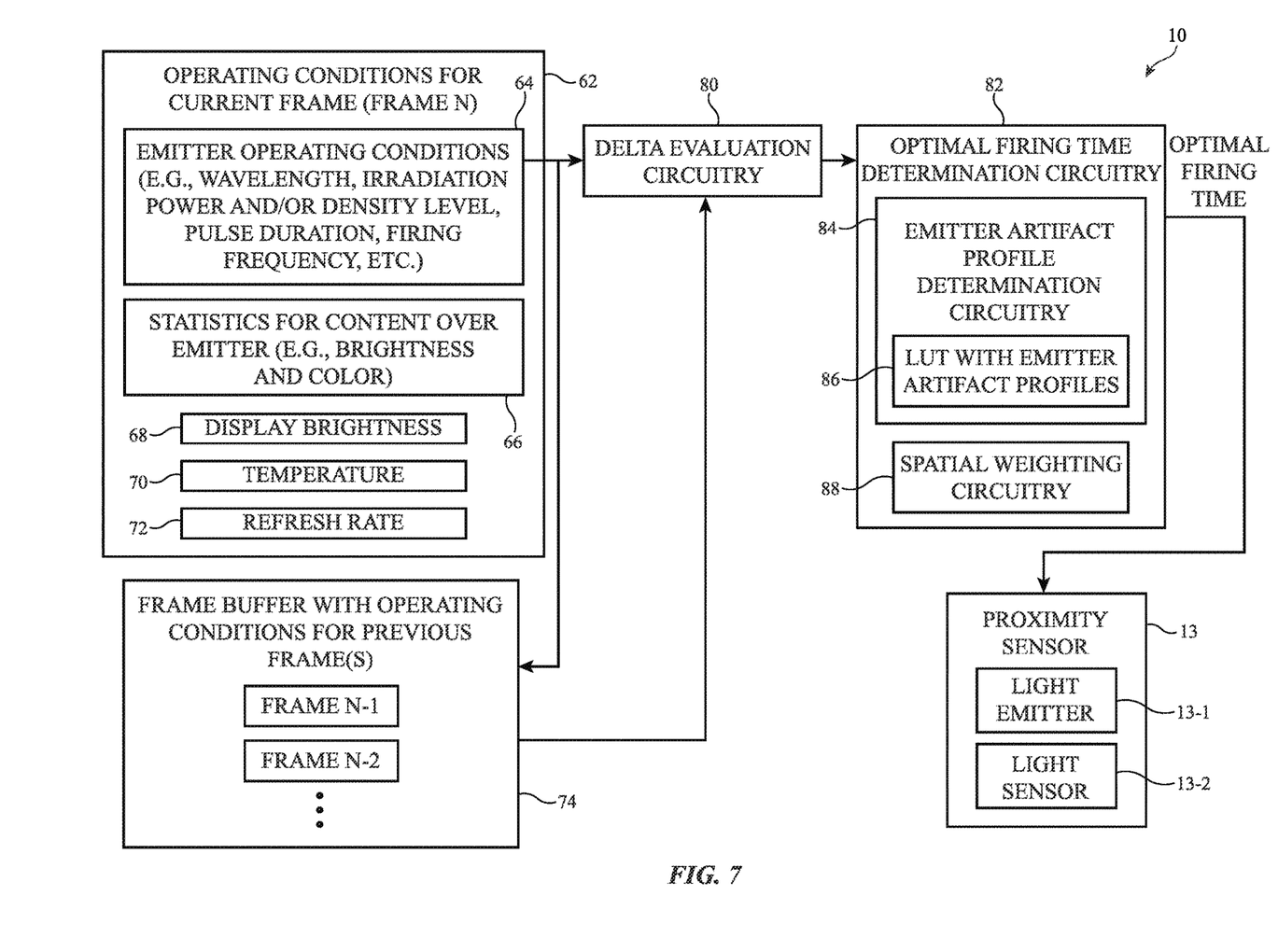
FIG. 7 is a schematic diagram of an illustrative electronic device with control circuitry that determines an optimal firing time for a light emitter in a proximity sensor in accordance with some embodiments.

FIG. 7 is a schematic diagram of an illustrative electronic device with control circuitry that derives an optimal emitter firing time for the real-time operating conditions of the display. As shown in FIG. 7, electronic device 10 may include delta evaluation circuitry 80 and optimal firing time determination circuitry 82. Delta evaluation circuitry 80 and optimal firing time determination circuitry 82 may be considered a part of control circuitry 16 in FIG. 1, for example. Delta evaluation circuitry 80 and optimal firing time determination circuitry 82 may be formed by one or more microprocessors, microcontrollers, digital signal processors, baseband processors, application-specific integrated circuits, etc.

Electronic device 10 includes a proximity sensor 13 with a light emitter 13-1 and a light sensor 13-2. Optimal firing time determination circuitry 82 may determine an optimal firing time for light emitter 13-1 based on the real-time operating conditions. Control circuitry within electronic device 10 subsequently controls light emitter 13-1 to begin emitting light (e.g., firing) at the optimal firing time. In particular, optimal firing time determination circuitry 82 may use operating conditions 62 for a current frame (e.g., frame N) to determine the optimal firing time for emitter 13-1. Optimal firing time determination circuitry 82 may optionally use operating conditions for one or more previous frames to determine the optimal firing time for emitter 13-1.

As shown in FIG. 7, a wide range of information may be included in the operating conditions 62 for the current frame. Any information that may impact the emitter artifacts may be included in operation conditions 62.

The operating conditions may include emitter operating conditions 64 (e.g., the emitter wavelength, the emitter irradiation power and/or density level, the emitter pulse duration, and/or the emitter firing frequency). One or more of the emitter operating conditions may be fixed in some electronic devices. Alternatively, the emitter may switch between two or modes (as shown in FIG. 4) and emitter operating conditions may be provided according to the real-time mode for the light emitter.

The operating conditions may include statistics for display content over emitter 13-1. In particular, the statistics may include the brightness and color of each pixel that overlaps light emitter 13-1 (e.g., pixels through which light from emitter 13-1 passes). The content statistics 66 may be represented, for example, using RGB values (sometimes referred to as gray levels) between 0 and 255. For example, consider a first pixel, a second pixel, and a third pixel that overlap emitter 13-1. The statistics for the first pixel may indicate that the first pixel is a red pixel with a value of 100.

The statistics for the second pixel may indicate that the second pixel is a green pixel with a value of 255. The statistics for the first pixel may indicate that the third pixel is a red pixel with a value of 0.

The operating conditions may include display brightness 68. As opposed to statistics 66, display brightness 68 may be a single value that indicates the current maximum brightness for the display. As one example, display brightness 68 may be lower in low ambient light conditions than in high ambient light conditions.

The operating conditions may include temperature 70. Temperature 70 may be received from a temperature sensor within device 10, for example. The temperature 70 indicates the real-time temperature of display 14 and/or electronic device 10.

The operating conditions may include refresh rate 72. Refresh rate 72 may be the current refresh rate of display 14. Refresh rate 72 may further include information regarding the duration of the blanking period between each display frame in display 14.

All of emitter operating conditions 64, content statistics 66, display brightness 68, temperature 70, and refresh rate 72 may impact the emitter artifacts in display 14. Any other additional information that may impact the emitter artifacts in display 14 may be included in operating conditions 62. In some cases, the display and/or emitter may have fixed properties that impact the emitter artifacts. These fixed properties may be included in operating conditions 62 for each frame or may be stored in optimal firing time determination circuitry 82.

In some cases, optimal firing time determination circuitry 82 factors in one or more previous frames in addition to the current frame. However, for simplicity, a scenario will first be described where optimal firing time determination circuitry 82 determines the optimal firing time based only on current operating conditions 62. In this type of embodiment, transient effects on the emitter artifacts are ignored and therefore frame buffer 74 and delta evaluation circuitry 80 (in FIG. 7) may be omitted.

Optimal firing time determination circuitry 82 may receive the operating conditions 62 for the current frame. Optimal firing time determination circuitry 82 may include emitter artifact profile determination circuitry 84 that determines a representative emitter artifact profile based on the real-time conditions.

As previously mentioned, the display content (e.g., the brightness and color of each pixel) impacts the emitter artifacts. Emitter artifact profile determination circuitry 84 may determine a representative emitter artifact profile for each pixel in the display that is impacted by emitter 13-1. Consider an example where a 6×6 grid of pixels is positioned over and impacted by emitter 13-1. For each one of the 36 pixels, emitter artifact profile determination circuitry may, using the brightness and color for that pixel (from statistics 66) and the other operating conditions 64, 68, 70, and 72, determine the estimated emitter artifact profile for that pixel.

After determining the emitter artifact profile for each pixel, the plurality of emitter artifact profiles (e.g., 36 in the example above) may be used to obtain a single representative emitter artifact profile for the pixels. In one possible arrangement, an average of the emitter artifact profiles may be used as the single representative emitter artifact profile for the pixels. However, different pixels may be more or less susceptible to emitter artifacts (e.g., due to the position of the pixel relative to the light from emitter 13-1 that passes through display 14). As an example, the beam profile of emitter 13-1 may have a roll off in signal with increasing distance from the center of the beam. Accordingly, spatial weighting circuitry 88 may take a weighted average of the emitter artifact profiles for of the pixels to obtain the single representative emitter artifact profile for the pixels.

Figure 8:
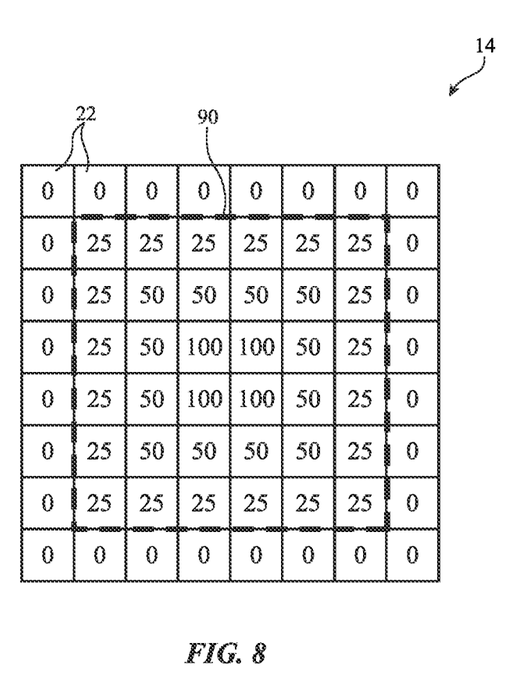
FIG. 8 is a top view of an illustrative display showing a weighted averaging scheme that may be applied to pixels in the display in accordance with some embodiments.

FIG. 8 is a top view of display 14 showing a spatial weighting scheme that may be applied using circuitry 88. The dashed line shows the boundary 90 of pixels impacted by the emitter 13-1. Accordingly, pixels within boundary 90 (e.g., the 6×6 grid of pixels) may be factored in the emitter artifact profile determination. As shown in FIG. 8, pixels in the center of boundary 90 may be weighted the most (e.g., with 100% weight factored into the weighted averages). Another group of pixels (e.g., in a ring around the center) may be weighted less than the central pixels (e.g., with 50% weight factored into the weighted averages). Another group of pixels (e.g., in a ring at the periphery) may be weighted the least (e.g., with 25% weight factored into the weighted averages). The example of weights applied to the different pixels in FIG. 8 is merely illustrative. In general, any desired weight may be applied to each pixel within the boundary. Outside of boundary 90, the pixels are not factored into the optimal firing time determination and accordingly are labeled with 0%. Calibration may be performed to determine the weight applied to each pixel in the spatial weighting scheme performed by spatial weighting circuitry 88.

As previously mentioned, for each pixel impacted by emitter artifacts, emitter artifact profile determination circuitry 84 may, using the brightness and color for that pixel (from statistics 66) and the other operating conditions 64, 68, 70, and 72, determine the estimated emitter artifact profile for that pixel. In one possible arrangement, this determination may be performed by circuitry 84 using a predictive model. Calibration data may be used to develop a predictive model (algorithm) that generates an estimated emitter artifact profile for a given set of operating conditions 62. During operation of device 10, circuitry 84 may provide the current set of operating data to the algorithm to generate the representative emitter artifact profile for that frame.

In other words, circuitry 84 may, for each pixel, use a predictive model to estimate the emitter artifact profile for that pixel. Spatial weighting circuitry 88 may then perform a weighted average of the emitter artifact profiles to obtain a single emitter artifact profile for the current frame of operating conditions 62.

Alternatively, as shown in FIG. 7, emitter artifact profile determination circuitry 84 may determine the emitter artifact profile for each pixel using a look-up table (LUT) 86. LUT 86 may include emitter artifact profiles for various ranges of the input variables (e.g., operating conditions 64, 66, 68, 70, and 72). The ranges of the variables for each LUT table entry may vary and may be selected depending on the impact of that variable on the emitter artifacts. For example, for a first set of operating conditions 64, 66, 68, and 72, temperature may have a small impact on emitter artifacts around room temperature and a larger impact at high temperatures. One entry in the LUT for the first set of operating conditions may include a temperature range of 20 degrees Fahrenheit (e.g., 62-82 degrees Fahrenheit). Another entry in the LUT for the first set of operating conditions may include a temperature range of 5 degrees Fahrenheit (e.g., 95-100 degrees Fahrenheit). Another entry in the LUT for the first set of operating conditions may include a temperature range of 2 degrees Fahrenheit (e.g., 101-103 degrees Fahrenheit). Including ranges for each variable in this manner enables a wide range of operating conditions to be represented in the look-up table without consuming excess memory.

In other words, circuitry 84 may, for each pixel, use a look-up table to determine the emitter artifact profile for that pixel. Spatial weighting circuitry 88 may then perform a weighted average of the emitter artifact profiles to obtain a single emitter artifact profile for the current frame of operating conditions 62.

Optimal firing time determination circuitry 82 may use the single representative emitter artifact profile generated by circuitry 84 to determine the optimal firing time for the current frame. The optimal firing time (sometimes referred to as an optimal firing delay) may be 0 (meaning that the emitter will emit light at the beginning of the display frame) or greater than 0 (meaning that the emitter will emit light after the optimal firing time has passed since the beginning of the display frame). As examples, operating conditions for a first frame may result in a representative emitter artifact profile matching profile 50 in FIG. 6. In this example, circuitry 82 outputs $t_1$ as the optimal firing time to emitter 13-1 in sensor 13. Then, according to the received optimal firing time, emitter 13-1 emits light after $t_1$ elapses from the beginning of the first frame. Operating conditions for a second frame may result in a representative emitter artifact profile matching profile 52 in FIG. 6. In this example, circuitry 82 outputs $t_2$ as the optimal firing time to emitter 13-1 in sensor 13. Then, according to the received optimal firing time, emitter 13-1 emits light after $t_2$ elapses from the beginning of the second frame. Operating conditions for a third frame may result in a representative emitter artifact profile matching profile 54 in FIG. 6. In this example, circuitry 82 outputs $t_3$ as the optimal firing time to emitter 13-1 in sensor 13. Then, according to the received optimal firing time, emitter 13-1 emits light after $t_3$ elapses from the beginning of the third frame.

In the aforementioned example, circuitry 82 determines the optimal firing time based on only the operating conditions for the current frame. This example is merely illustrative. If desired, circuitry 82 may determine the optimal firing time based on the operating conditions 62 for the current frame and the operating conditions from previous frames. As shown in FIG. 7, frame buffer 74 may store the operating conditions for one or more previous frames (e.g., frame N-1, N-2, etc.). After each frame, the operating conditions 62 may be provided to frame buffer 74 to be stored as the operating conditions for frame N-1.

The operating conditions for the one or more previous frames may optionally be provided directly to circuitry 82 if desired. Circuitry 82 then determines the optimal firing time for a current frame based on the operating conditions 62 for the current frame and the operating conditions from previous frames.

Alternatively, the operating conditions 62 for the current frame and the operating conditions for the one or more previous frames may optionally be provided to delta determination circuitry 80. Delta determination circuitry 80 may determine if any of the operating conditions have changed by a sufficient magnitude to warrant a reevaluation of the optimal firing time. If the operating conditions for frame N are sufficiently similar to the operating conditions for frame N-1, delta evaluation circuitry 80 may take no further action (or notify circuitry 82 that no updates to the optimal firing time are needed). If the operating conditions for frame N are sufficiently different than the operating conditions for frame N-1, delta evaluation circuitry 80 may pass the operating conditions for frame N and/or one or more previous frames (from buffer 74) to optimal firing time determination circuitry 82 (and/or notify circuitry 82 that a reevaluation of to the optimal firing time is needed).

Delta determination circuitry 80 may use a different threshold difference for each operating condition and trigger a reevaluation of optimal firing time whenever one of the operating conditions exceeds its threshold difference.

Factoring in the operating conditions of one or more previous frames (using a frame buffer as in FIG. 7) may allow for compensation of transient impacts on the emitter artifacts.

Figure 9:
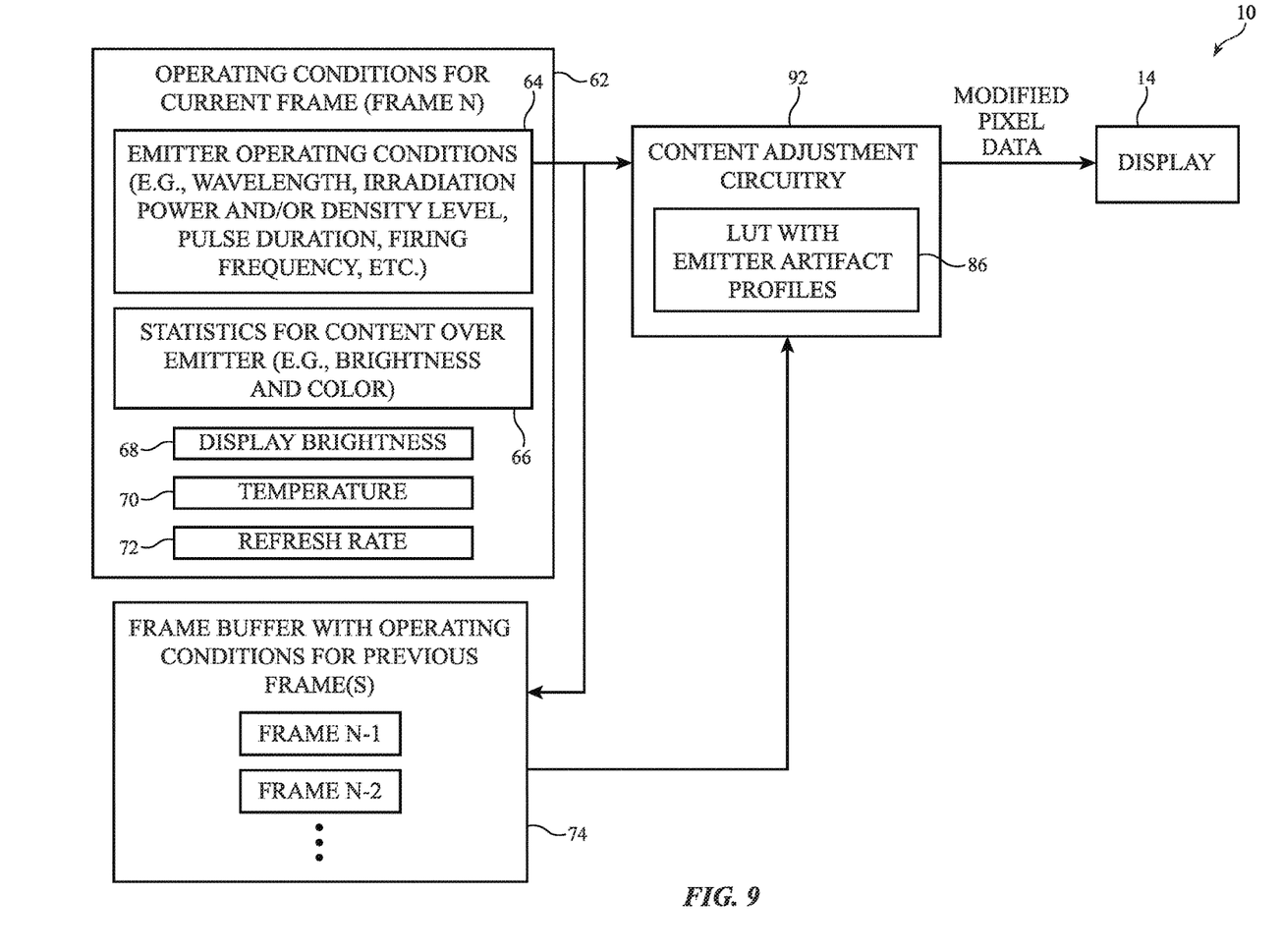
FIG. 9 is a schematic diagram of an illustrative electronic device with control circuitry that modifies pixel data to mitigate emitter artifacts in accordance with some embodiments.

Another technique for mitigating emitter artifacts is to adjust the content on the display. FIG. 9 is a schematic diagram of an electronic device of this type. As shown in FIG. 9, electronic device may include content adjustment circuitry 92 that is configured to, based on operating conditions for at least a current frame, provide modified pixel data to display 14 that mitigates emitter artifacts. Content adjustment circuitry 92 may be considered a part of control circuitry 16 in FIG. 1, for example. Content adjustment circuitry 92 may be formed by one or more microprocessors, microcontrollers, digital signal processors, baseband processors, application-specific integrated circuits, etc.

As shown in FIG. 9, content adjustment circuitry 92 may receive operating conditions 62 for the current frame as well as for one or more previous frames (from buffer 74). This arrangement is largely the same as in FIG. 7 and duplicate portions will not be described again for brevity. One difference between FIGS. 7 and 9 is that in FIG. 9, emitter operating conditions 64 may include the emitter firing delay. In other words, the emitter firing delay is fixed and content adjustment circuitry 92 modifies the display content to mitigate emitter artifacts given the fixed firing delay.

Content adjustment circuitry 92 may, for each pixel impacted by emitter artifacts, determine the emitter artifact profile for that pixel (e.g., using LUT 86 or a predictive model) and adjust the brightness of that pixel such that the perceived brightness (with the added impact of the emitter artifact) matches the target brightness.

Consider an example where statistics 66 indicate a target value of 100 for a red pixel positioned over emitter 13-1. Content adjustment circuitry 92 may identify an emitter artifact profile in look-up table 86 associated with the target value of 100. The emitter artifact profile may indicate that the emitter artifacts for the current operating conditions may result in emitter artifacts that cause a drop of 10 in the perceived gray level. After the effect of the emitter artifacts, the pixel will have a perceived brightness of 90 instead of 100. To mitigate this type of change between the target brightness of the pixel and the perceived brightness of the pixel, the value for the pixel may be modified. Continuing this example, content adjustment circuitry 92 may identify that a target value of 108 has an emitter artifact profile that indicates a drop of 8 in the perceived gray level. In other words, after the effect of the emitter artifacts, the pixel will have a perceived brightness of 100 instead of 108. Accordingly, content adjustment circuitry 92 may output 108 as the modified pixel value for the pixel. After the modified pixel value is used to display light on display 14, the pixel will have a perceived brightness that matches the initial target value of 100. This type of process may be repeated for each pixel in the area impacted by emitter artifacts to mitigate the perceived emitter artifacts in the display.

If desired, any two or more of the aforementioned emitter artifact mitigation techniques may be used in a single electronic device. For example, using both optimized firing period (as in FIG. 7) and content modification (as in FIG. 9) may offer high flexibility in mitigating emitter artifacts.

Additionally, the emitter artifact mitigation techniques may be tailored to the real-time ambient light conditions. For example, less processing-intensive emitter artifact mitigation may be used when ambient light conditions are bright (and emitter artifacts are less noticeable) whereas more processing-intensive emitter artifact mitigation may be used when ambient light conditions are dim (and emitter artifacts are more noticeable).

The example herein of mitigating emitter artifacts from an infrared light source in a proximity sensor is merely illustrative. In general, the emitter artifact mitigation techniques described herein may be applied to any type of emitter that operates through display 14 (e.g., a light source that is part of a sensor other than a proximity sensor or a light source that is not part of a sensor). In general, the emitter artifact mitigation techniques described herein may be applied emitters that operate at any wavelengths (e.g., infrared, ultraviolet, etc.).

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a display comprising pixels;
   a sensor comprising a light emitter that emits light through the display; and
   control circuitry configured to:
     based on a first set of operating conditions for a first display frame and a second set of operating conditions for a second display frame, determine a first optimal firing time for the light emitter in the sensor, wherein the first optimal firing time is a delay relative to the beginning of the first display frame and wherein the second display frame is previous to the first display frame;
     based on the second set of operating conditions for the second display frame, determine a second optimal firing time for the light emitter in the sensor, wherein the second optimal firing time is a delay relative to the beginning of the second display frame and the second optimal firing time is different from the first optimal firing time; and
     control the light emitter to emit light at the first and second optimal firing times, respectively, during the first and second display frames.

2. The electronic device defined in claim 1, wherein the first set of operating conditions for the first display frame comprises operating conditions for the light emitter.

3. The electronic device defined in claim 2, wherein the operating conditions for the light emitter comprise an operating condition selected from the group consisting of: a wavelength for the light emitter, an irradiation power for the light emitter, a pulse duration for the light emitter, and a firing frequency for the light emitter.

4. The electronic device defined in claim 1, wherein the first set of operating conditions for the first display frame comprises statistics for a subset of the pixels.

5. The electronic device defined in claim 4, wherein the statistics for the subset of the pixels comprise color and brightness information for the subset of the pixels.

6. The electronic device defined in claim 5, wherein the light from the light emitter passes through the subset of the pixels.

7. The electronic device defined in claim 5, wherein the control circuitry is configured to, for each pixel in the subset of the pixels, determine an emitter artifact profile for that pixel using a look-up table.

8. The electronic device defined in claim 7, wherein the control circuitry is configured to use a weighted average of the emitter artifact profiles for the subset of the pixels to obtain a single representative emitter artifact profile for the subset of the pixels and wherein determining the first optimal firing time for the light emitter in the sensor comprises determining the first optimal firing time for the light emitter in the sensor based on the single representative emitter artifact profile.

9. The electronic device defined in claim 5, wherein the control circuitry is configured to, for each pixel in the subset of the pixels, determine an emitter artifact profile for that pixel using a predictive model.

10. The electronic device defined in claim 9, wherein the control circuitry is configured to use a weighted average of the emitter artifact profiles for the subset of the pixels to obtain a single representative emitter artifact profile for the subset of the pixels and wherein determining the first optimal firing time for the light emitter in the sensor comprises determining the first optimal firing time for the light emitter in the sensor based on the single representative emitter artifact profile.

11. The electronic device defined in claim 1, wherein the first set of operating conditions for the first display frame comprises a display brightness or a refresh rate for the display.

12. The electronic device defined in claim 1, further comprising:
    a temperature sensor, wherein the first set of operating conditions for the first display frame comprises a temperature from the temperature sensor.

13. The electronic device defined in claim 1, wherein the sensor comprises a proximity sensor.

14. The electronic device defined in claim 1, further comprising:
    a frame buffer configured to store at least the second set of operating conditions for the second display frame.

15. The electronic device defined in claim 1, wherein the control circuitry is configured to:
    determine a difference between an operating condition for the first display frame and the operating condition for the second display frame; and
    in response to the difference being less than a threshold, control the light emitter to emit light at a previously determined first optimal firing time during the first display frame.

16. The electronic device defined in claim 1, wherein the control circuitry is configured to:
    determine a difference between an operating condition for the first display frame and the operating condition for the second display frame, wherein determining the first optimal firing time for the light emitter in the sensor based on the first set of operating conditions for the first display frame and the second set of operating conditions for the second display frame comprises determining the first optimal firing time for the light emitter in the sensor based on the first set of operating conditions for the first display frame in response to the difference being greater than a threshold.

17. The electronic device defined in claim 1, wherein the light emitter is an infrared light emitter that emits infrared light.

18. The electronic device of claim 1, wherein determining the second optimal firing time for the light emitter in the sensor based on the second set of operating conditions for the second display frame comprises determining the second optimal firing time for the light emitter in the sensor based on the second set of operating conditions for the second display frame and at least a third set of operating conditions for a third display frame, wherein the third display frame is previous to the second display frame.

19. An electronic device, comprising:
a display comprising pixels;
a proximity sensor comprising a light emitter that emits light through the display; and
control circuitry configured to, based on operating conditions for a given display frame, modify pixel data for the given display frame to mitigate artifacts caused by the light from the light emitter passing through the display, wherein at least one pixel in the display for the given display frame has an initial target brightness and a perceived brightness, wherein the perceived brightness is affected by the artifacts caused by the light from the light emitter passing through the display, and wherein modifying the pixel data for the given display frame comprises adjusting a brightness of the at least one pixel from a first magnitude to a second magnitude so that the perceived brightness of the at least one pixel matches the initial target brightness of the at least one pixel.

20. An electronic device, comprising:
a display comprising pixels;
a proximity sensor comprising a light emitter that emits light through the display; and
control circuitry configured to:
for each pixel in a subset of the pixels, determine an emitter artifact profile for that pixel using at least a brightness of that pixel for a given display frame and a look-up table;
spatially weight the emitter artifact profiles for the subset of the pixels to obtain a single representative emitter artifact profile for the subset of the pixels;
use the single representative emitter artifact profile to determine an optimal firing time for the light emitter in the proximity sensor; and
control the light emitter to emit light at the optimal firing time during the given display frame.

* * * * *